3,573,935
PROCESS OF PASTEURIZATION OF WHOLE EGGS

John C. Sourby, Mount Kisco, and Willibald F. Kohl, Nanuet, N.Y., and Rudolph H. Ellinger, Chagrin Falls, Ohio, assignors to Stauffer Chemical Company, New York, N.Y.
No Drawing. Continuation-in-part of application Ser. No. 694,831, Jan. 2, 1968. This application May 4, 1970, Ser. No. 34,911
Int. Cl. A23b 5/00
U.S. Cl. 99—161
4 Claims

ABSTRACT OF THE DISCLOSURE

A process of pasteurizing liquid whole eggs which consists of separating the eggs from the shells and forming a homogeneous mixture. Sufficient food grade alkali agent is then incorporated therein to raise the pH thereof about 0.5 unit above the natural pH of the eggs and not to exceed a pH of about 8.3. The mixture is then heated to a pasteurization temperature of from 125 to 145° F. for from 0.5 to 10 minutes.

REFERENCE TO RELATED APPLICATION

The present application is a continuation-in-part of applicants' co-pending application S.N. 694,831 filed Jan. 2, 1968.

BACKGROUND OF THE INVENTION

There are a number of food poisoning microorganisms that cause serious problems in the food industry. Among these different spoilage organisms, which may contaminate foodstuff, the group Salmonellae have gained special importance. Salmonellae are pathogenic gram-negative rod-like bacteria that have drawn much recent attention, that is well documented in the literature. Of the several food areas involved, particular interest has been generated in a reduction of Salmonellae in liquid eggs. The contents of an egg with unbroken shell may already contain bacteria caused by the infection of a laying hen. The exterior surface of the egg may be contaminated with bacteria from the intestinal tract of the hen, from the nest, or other material contacted after laying. Some of these can be introduced into egg products during breaking operations. Bacteria can also penetrate the shell from outside. The invading microorganisms infect the egg and can be carried on into a variety of egg products.

The elimination of Salmonellae by pasteurization of egg products has become mandatory on United States Department of Agriculture regulation. According to these regulations, all egg products have to be pasteurized regardless of whether they are to be distributed in frozen, liquid, or dried form. At present, the common method of pasteurization of the whole egg is to remove the egg from the shell and mix the same together to form a homogeneous mixture of egg white and egg yolk. Thereafter, the liquid whole eggs are heated to a temperature of between 140 and 143° F. for about 3.5 minutes. This procedure has proved to kill most Salmonellae embodied within the egg product but some Salmonellae may survive and stay within the egg product after pasteurization. Attempts to eliminate the Salmonellae completely within the egg products include the use of a higher temperature for the pasteurization process. However, the high temperatures involved break down proteins within the egg constituents. Precipitation of the proteins or discoloration of the liquid whole eggs results in an unsaleable product.

Thus, all pasteurization processes of eggs must be a compromise between the amount of heat applied to kill Salmonellae and the coagulation of the egg proteins, which affect the functional properties thereof. Although naturally occurring levels of Salmonellae are seldom greater than 100 per milliliter of egg product, present processes have need of improvement to minimize undesirable effects on the functional properties of the egg product, excessive buildup on plant equipment, and lack of retained inhibitory effects after pasteurization.

BRIEF DESCRIPTION OF THE INVENTION

It has been discovered that whole eggs can be readily pasteurized and the bacteria count can be materially reduced by incorporating within the liquid whole eggs prior to pasteurization, a sufficient amount of alkali material to adjust the pH of the whole eggs 0.5 pH units above the natural pH thereof and not to exceed a pH of 8.3 followed by heating the so treated eggs to a temperature of between 125 to 145° F. to pasteurize the eggs. This combination of pH adjustment with heat has sufficient power to materially reduce the number of Salmonellae within the whole eggs. Without the pH adjustment, the whole eggs will coagulate, and become unacceptable when subjected to the pasteurization conditions described.

DETAILED DESCRIPTION OF THE INVENTION

In the practice of the preferred form of the present invention, whole eggs are first separated from the egg shell in a conventional manner and mixed together to form a homogeneous mixture.

After the formation of the liquid whole egg mixture an alkali material selected from the group consisting of sodium hydroxide, ammonium hydroxide, potassium hydroxide, calcium hydroxide, sodium phosphate, sodium carbonate, sodium bicarbonate, and mixtures thereof, is added to the liquid whole eggs to adjust the pH of the whole eggs to at least 0.5 above the natural pH of the liquid whole eggs. Care should be maintained not to exceed a pH of about 8.3. In the event that this pH is exceeded, the material is heated under the conditions of pasteurization, the protein material within the whole eggs will precipitate and the functional properties will be materially altered, resulting in an unusable or unsaleable egg product.

After the above additives have been dissolved within the whole eggs to adjust the pH, the eggs are subjected to a temperature of between 125 to 145, preferably about 130° F., for a time between 0.5 and 10 minutes, preferably 3.5–5 minutes. The amount of time that the eggs are subjected to this heat will depend upon the pH that the eggs are raised to. Thereafter, the eggs are cooled, the pH adjusted to the original value with a food grade acid such as lactic acid, citric acid, or, if a non-food use of the eggs is contemplated, any acid and stored for use.

In order to illustrate the merits of the invention, the following examples are provided:

EXAMPLE 1

Fresh eggs were broken by hand. The shells were removed and the contents of the eggs were mixed to a uniform blend. The pH of the egg blend was 7.0. A bacterial culture of *Salmonellae typhimurium* was added thereto to provide a bacteria concentration of 103,000 Salmonellae per ml. of liquid eggs. An aqueous solution of 10% sodium hydroxide was added dropwise to the eggs until the pH of the eggs was raised to 8.2. Thereafter, the liquid whole eggs were pasteurized in a laboratory pasteurization apparatus at a temperature of 136° F. for a holding time of 5 minutes at this temperature. The eggs were then quickly cooled. A microbiological analysis was conducted to detect possible surviving Salmonellae. The analysis yielded no surviving bacterial indicating that all Salmonellae had been killed through the treatment.

EXAMPLE 2

The procedure as set forth in Example 1 was repeated in its entirety except that the pH was not changed prior to pasteurization of the eggs. An assay of the pasteurized liquid whole eggs using standard microbiological procedures indicated a survival of 4200 Salmonellae per milliliter.

The baking performance of the eggs pasteurized in accordance with the invention was evaluated in a sponge cake formula prepared in the following manner:

168 grams of liquid whole eggs were mixed in a kitchen style mixer at No. 8 speed for two minutes. A blend of 0.75 gram salt and 0.75 gram of cream of tartar was then added to the above mixture and mixed for an additional 1 minute at No. 8 speed. Then, 75 grams of granulated sugar was added. The eggs were then mixed for two additional minutes at No. 8 speed. Thereafter, a mixture consisting of 64 grams of cake flour and 38 grams of granulated sugar were added thereto in 30 seconds while the batter was mixed slowly at No. 1 speed. The specific gravity of the batter was measured and the batter was then poured into six inch pans and baked at 355° F. for 30 minutes. The eggs were found to exhibit the following characteristics:

(1) Egg color yellow (orange color is acceptable),
(2) Specific gravity of the batter was sufficiently low to indicate high air encapsulation during mixing, which is desirable for the preparation of high quality cakes.
(3) Cake volume measured by standard seed displacement was acceptable.

In comparison, a whole egg mixture treated with either ammonium or sodium hydroxide sufficient to raise the pH of the eggs to 9 produced an unacceptable brown color, with generally higher specific gravity of the batter and lower cake volume as compared to whole eggs, and whole eggs pasteurized with or without pH adjustment.

What is claimed:
1. A process for pasteurizing liquid whole eggs, comprising the steps of:
 (a) dissolving a food grade alkali agent within said liquid whole eggs to provide a pH thereof of about 0.5 unit above the natural pH thereof and not to exceed a pH of about 8.3;
 (b) heating said eggs to a pasteurization temperature for a sufficient length of time to pasteurize them.
2. The process as set forth in claim 1, wherein said alkali agents may be selected from the group consisting of sodium hydroxide, ammonium hydroxide, potassium hydroxide, calcium hydroxide, sodium phosphate, sodium carbonate, sodium bicarbonate, and mixtures thereof.
3. The process as set forth in claim 1, wherein said pasteurization temperature can range between 125 and 145° F.
4. The process as set forth in claim 1, wherein said pasteurization temperature is held for from 0.5 to 10 minutes.

References Cited

UNITED STATES PATENTS 3,471,302  10/1969  Rogers _____ 99—161

OTHER REFERENCES

Eggs—pp. 667–668, Kirk-Othmer Encyclopedia of Chemical Technology, Second ed., 1965, vol. 7.

Hydrogen Peroxide—p. 394, Kirk-Othmer Encyclopedia of Chemical Technology, Second ed., 1965.

NORMAN YUDKOFF, Primary Examiner

H. BERNSTEIN, Assistant Examiner

U.S. Cl. X.R.

99—215